(12) United States Patent
Cianciara et al.

(10) Patent No.: US 6,421,625 B1
(45) Date of Patent: Jul. 16, 2002

(54) METHOD FOR CHECKING ANALOG SENSORS

(75) Inventors: Wojciech Cianciara, Grünthal; Ralph Mader, Bad Abbach; Michael Stürtz, Regensburg; Gerhard Fischer, Maxhütte-Deglhof, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/431,574

(22) Filed: Nov. 1, 1999

(30) Foreign Application Priority Data

Oct. 30, 1998 (DE) .......................................... 198 50 175

(51) Int. Cl.7 .............................................. F01P 11/00
(52) U.S. Cl. ...................... 702/130; 702/113; 702/182; 701/45; 701/114; 123/41.15; 73/35.03; 73/35.06; 73/35.07
(58) Field of Search ................................ 702/130, 116, 702/182, 185, 113; 701/114, 45; 123/41.01, 41.05, 41.12, 41.15, 406.55, 688, 689, 479; 73/35.03, 35.06, 35.07

(56) References Cited

U.S. PATENT DOCUMENTS 4,556,029 A * 12/1985 Yamaguchi et al. ..... 123/41.15
5,003,954 A * 4/1991 Yakuwa et al. ............. 701/114
5,216,882 A * 6/1993 Kuroda et al. .............. 123/688
5,235,527 A * 8/1993 Ogawa et al. .............. 702/116
5,253,173 A * 10/1993 Drobny et al. ................ 701/45
5,553,489 A 9/1996 Connell et al. ............ 73/118.1

FOREIGN PATENT DOCUMENTS

DE 3328450 A1 2/1985
DE 19705766 C1 8/1998

* cited by examiner

Primary Examiner—John S. Hilten
Assistant Examiner—Hien Vo
(74) Attorney, Agent, or Firm—Laurence A. Greenberg; Werner H. Stemer; Gregory L. Mayback

(57) ABSTRACT

After the start of an internal combustion engine, a check is made to see whether a positive change in a measurement signal is established. A positive change is established if the measurement signal lies below a predetermined threshold value when the internal combustion engine is started. A fault entry is made if, within a predetermined time period, the positive change in the measurement signal, expressed as the difference between the measurement signal when the internal combustion engine is started and a present value of the measurement signal when the time period has elapsed, does not reach an expected value.

7 Claims, 3 Drawing Sheets

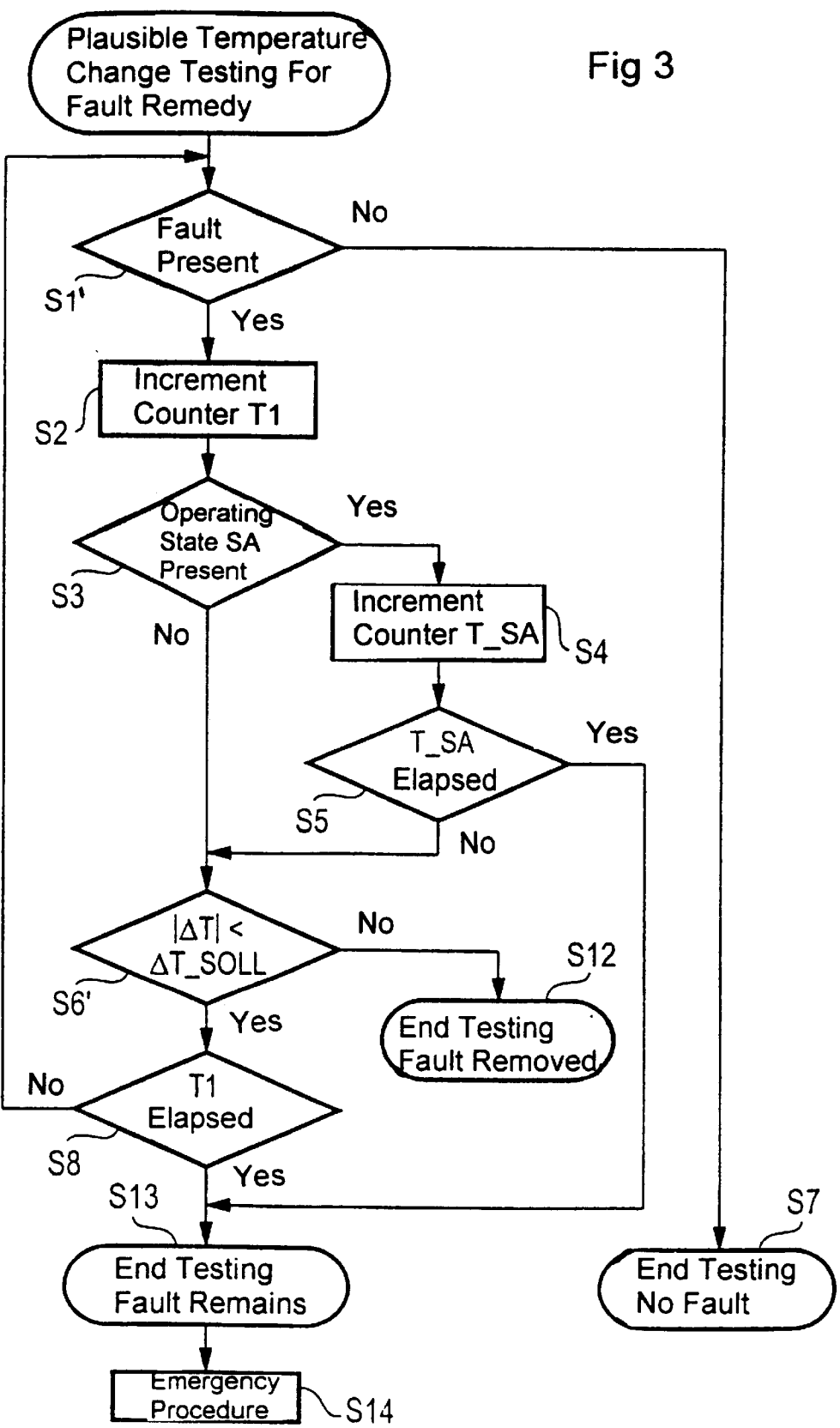

METHOD FOR CHECKING ANALOG SENSORS

BACKGROUND OF THE INVENTION

Field of the Invention

The invention relates to a method for checking analog sensors which cyclically acquire measurement signals that are representative of operating conditions of an internal combustion engine. The measurement signals are fed to a controller of the internal combustion engine for further processing and the sensors are evaluated in regard to the plausibility of the measurement signals on a basis of measured values in a predetermined time period.

With the increasing use of electronics in motor vehicles, the number of built-in sensors and sensor systems is also growing not only for the straightforward traveling functions but also for safety functions, for protecting the environment and for luxury features. By use of an electronic control unit which obtains its information from these sensors, suitable measures required for the operation of the internal combustion engine are taken, such as, for example, regulation of the ignition and of the fuel injection. In order to ensure optimum utilization of the fuel with the smallest burden on the environment and maximum traveling comfort, the intake air temperature and, in particular, the temperature of the coolant of the internal combustion engine are detected, inter alia, by analog temperature sensors. Since the output signals of these temperature sensors influence both the engine management and the exhaust gas management, the temperature sensors must be checked with regard to their functionality.

Published, Non-Prosecuted German Patent Application DE 33 28 450 A1 discloses a method for checking measurement sensors which acquire electrical measurement signals that are representative of the operating conditions of an internal combustion engine and are statically monitored in a checking unit. The measurement signals of the operating parameters of the internal combustion engines are acquired cyclically and checked with regard to their measured value change from one interrogation cycle to a succeeding interrogation cycle, and are accepted only when the measured value change lies within permissible limits. Stochastic interference is masked out of the measurement signal, recorded and tolerated up to a practical limit. If an erroneous measurement signal is identified, an emergency procedure that counteracts this fault is activated. Such a method makes it possible to ascertain whether the sensor output signal is within a plausible range of values. sensors, in particular temperature sensors, under certain circumstances exhibit a sporadic behavior such that the sensor output signal jumps to a constant value within the plausible range of values. This fault may even remedy itself. The known gradient test can detect these jumps only when they occur during the operation of the electronic controller that evaluates the output signal of the sensor. If the fault occurs with the controller switched off, it is not identified. In a subsequent operating phase, that is to say when the internal combustion engine is restarted, the value, which is now constant, of the output signal of the sensor is considered to be in order. On account of the incorrect information, the internal combustion engine is not controlled or regulated optimally, which can lead to elevated exhaust gas emissions, in particular.

SUMMARY OF THE INVENTION

It is accordingly an object of the invention to provide a method for checking analog sensors which overcomes the above-mentioned disadvantages of the prior art methods of this general type.

With the foregoing and other objects in view there is provided, in accordance with the invention, a method for checking analog sensors that output measurement signals representative of operating conditions of an internal combustion engine, which includes:

during a first traveling cycle after a start of the internal combustion engine, checking to see if a positive change in a measurement signal of an analog sensor has occurred if an initial measurement signal of the analog sensor lies below a predetermined threshold value when the internal combustion engine is started; and entering a fault entry into a fault memory if, within a predetermined time period, the positive change in the measurement signal, expressed as a difference between the initial measurement signal when the internal combustion engine was started and a present value of the measurement signal when the predetermined time period has elapsed, does not reach an expected value.

After the start of the internal combustion engine, a check is made to see whether a positive change in the measurement signal is established if the measurement signal lies below a predetermined threshold value when the internal combustion engine is started. A fault entry is made if, within a predetermined time period, the change in the measurement signal, expressed as the difference between the measurement signal when the internal combustion engine is started and the present value of the measurement signal when the time period has elapsed, does not reach an expected value.

Since the possibility of the fault being remedied is no longer afforded in this traveling cycle, a check is made during the succeeding traveling cycle to see whether the absolute value of the change in the measurement signal exceeds the expected value within the predetermined time period. If this is the case, then the fault is deemed to have been remedied. Sporadically occurring faults can thus be reliably distinguished from permanently occurring faults, as a result of which it is possible to prevent sensors from being replaced unnecessarily.

Other features which are considered as characteristic for the invention are set forth in the appended claims.

Although the invention is illustrated and described herein as embodied in a method for checking analog sensors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a flow diagram relating to the checking of a plausible temperature change for remedying faults.

DESCRIPTION OF THE PREFERRED EMBODIMENTS

Figure 1:
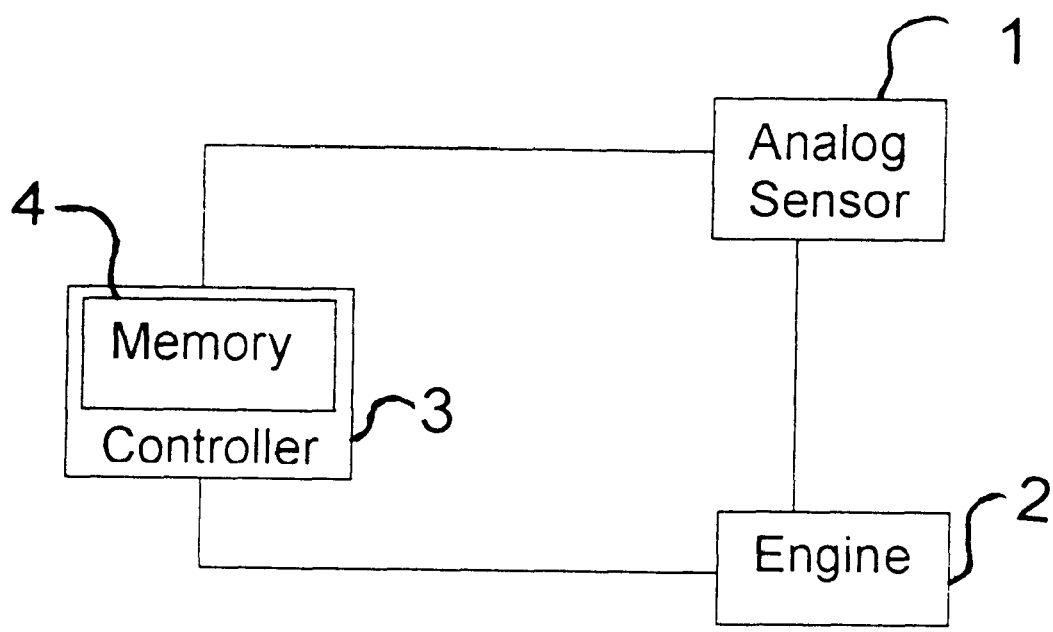
FIG. 1 is a diagrammatic, block diagram of a sensor system for an internal combustion engine.

In all the figures of the drawing, sub-features and integral parts that correspond to one another bear the same reference symbol in each case. Referring now to the figures of the drawing in detail and first, particularly, to FIG. 1 thereof, there is shown an analog temperature sensor 1 for evaluating an internal combustion engine 2. It is assumed that after the start of the internal combustion engine 2, a positive temperature change will be established if the temperature lies below an adjustable threshold value when the internal combustion engine 2 is started.

Figure 2:
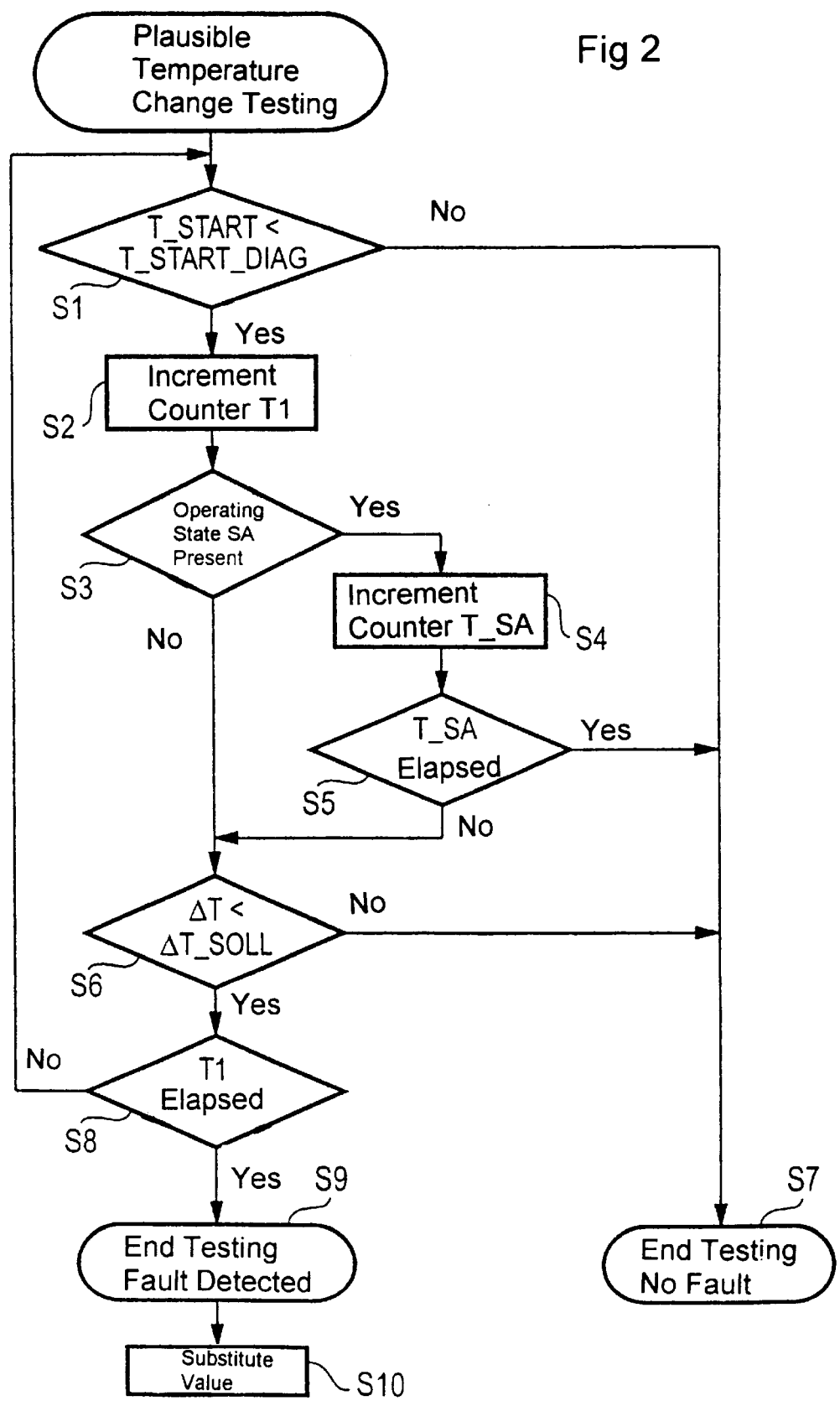
FIG. 2 is a flow diagram relating to checking for the plausible of a temperature rise for identifying faults according to the invention.

FIG. 2 shows a flow diagram for testing the analog temperature sensor 1. In a first method step S1, therefore, immediately after a start of the internal combustion engine 2, a signal T_START of the temperature sensor 1 is acquired and a check is made to see whether this value lies below a predetermined threshold value T_START_DIAG. The threshold value is determined experimentally and is stored in a memory 4 of a controller 3 for the internal combustion engine 2. If the threshold value T_START_DIAG is already present when the internal combustion engine 2 is started, then a test with regard to the plausibility of an output signal of the temperature sensor 1 is not carried out and the method is ended (method step S7). This situation arises in particular when the internal combustion engine 2 is stopped only briefly and then restarted. The temperature of the internal combustion engine 2 is already so high that after the restart of the internal combustion engine 2, the temperature change on account of renewed operation is only very small and, consequently, a practical test of the temperature sensor 1 is not possible.

If the temperature at the start T_START lies below the above-mentioned threshold value T_START_DIAG, then method step S2 provides for incrementing a time counter for an adjustable time period T1 and then in method step S3 a check is made to see whether the internal combustion engine 2 is in the operating state of overrun cutoff (coasting) SA. If this operating state is present, then the method provides for incrementing a further time counter for an adjustable time period T_SA and subsequent interrogation of whether the predetermined time period T_SA has already elapsed (method steps S4 and S5). Since, in the operating state of overrun cutoff, the fuel injection is interrupted and, consequently, no combustion processes take place in the cylinders, no temperature increase is established either. If the sum of the times during which the internal combustion engine 2 is in the operating state of overrun cutoff exceeds the predetermined time period T_SA, then it is assumed that the internal combustion engine 2 is not increased by a predetermined value ΔT and the method is ended (method step S7).

If the time period T_SA has not yet elapsed, in other words if the internal combustion engine 2 was operated only for short periods of time in the operating range of overrun cutoff or the interrogation in method step S3 was negative, then in method step S6 a check is made to see whether the temperature change ΔT lies below a predetermined expected value ΔT_DESIRED. For this purpose, the present value T of the temperature is acquired and the difference between the value T and the value when the internal combustion engine is started T_START is formed (ΔT=T−T_START) and compared with the expected value ΔT_DESIRED.

If the temperature change lies above the expected value then the test is ended (method step S7), otherwise method step S8 provides for interrogation of whether the predetermined time period Ti since the start of the internal combustion engine 2 has elapsed. If the result of the interrogation is negative, the method branches to method step S1. If the temperature change ΔT remains below the expected value ΔT_DESIRED within the time period T1, the test is ended and a fault is entered into a fault memory. For the purpose of controlling the internal combustion engine, use is made of a substitute value for the obviously implausible temperature signal (method step S10). In the case of the failure of the coolant temperature sensor, the substitute value may either be derived from the signal of an intake air temperature sensor or be a permanently stored value for the temperature. Fault remedying is no longer possible during this traveling cycle.

If a fault was entered into the fault memory in a preceding traveling cycle, then it is possible to use the test with regard to a plausible change in the output signal of the analog sensor 1 for the purpose of remedying faults, as is illustrated by the flow diagram specified in FIG. 3.

The method for checking a plausible temperature change for the purpose of remedying faults is largely identical to the method for identifying faults as described with reference to FIG. 2, for which reason the identical method steps S2–S5, S7, S8 appearing in both methods will not be explained again.

Instead of method step S1 in the method for identifying faults according to FIG. 2, which provides for interrogation of whether the start temperature lies below the threshold value, this method provides for interrogation of whether a fault entry is present at step 1'. If no fault was entered in the preceding traveling cycle, then the method branches to method step S7 (already described).

Method steps S3–S5 are identical to the corresponding method steps in FIG. 1. In contrast to method step S6 in FIG. 2, in method step S6' it is not the temperature change ΔT that is now compared with the expected value ΔT_DESIRED, but rather the absolute value of the temperature change |ΔT|. If the absolute value of the temperature change |ΔT| lies above the expected value ΔT_DESIRED, then the fault is deemed to have been remedied and the method is ended (method step S7).

If the absolute value of the temperature change |ΔT| remains below the expected value ΔT_desired within the time period T1, then in method step S13 it is ascertained that the fault is present unchanged, and an emergency running procedure is initiated (method step S14).

We claim:

1. A method for checking analog sensors that output measurement signals representative of operating conditions of an internal combustion engine, which comprises:

during a first traveling cycle after a start of the internal combustion engine, checking to see if a positive change in a measurement signal of an analog sensor has occurred if an initial measurement signal of the analog sensor lies below a predetermined threshold value when the internal combustion engine is started; and entering a fault entry into a fault memory if, within a predetermined time period, the positive change in the measurement signal, expressed as a difference between the initial measurement signal when the internal combustion engine was started and a present value of the measurement signal when the predetermined time period has elapsed, does not reach an expected value.

2. The method according to claim 1, which comprises ending the checking step without entering the fault entry if the positive change in the measurement signal exceeds the expected value.

3. The method according to claim 1, which comprises deriving a substitute value from further operating conditions of the internal combustion engine after entering the fault entry for controlling the internal combustion engine, and using the substitute value for the measurement signal.

4. The method according to claim 1, which comprising:

determining if an overrun cutoff operating state is present after the start of the internal combustion engine;

acquiring times during which the internal combustion engine is operated in the overrun cutoff operating state; and terminating the checking step if a sum of the times exceeds a further predetermined threshold value.

5. The method according to claim 1, which comprises:

during a present traveling cycle that is outside an overrun cutoff operating state of the internal combustion engine, determining if an absolute value of the positive change in the measurement signal exceeds the expected value within the predetermined time period if the fault entry had been made during a preceding traveling cycle of the internal combustion engine; and determining that a fault has been remedied if a positive result occurs in the determining step.

6. The method according to claim 5, which comprises:

confirming the entering of the fault entry if the absolute value of the positive change in the measurement signal does not reach the expected value; and initiating an emergency operating procedure for the internal combustion engine.

7. The method according to claim 1, which comprises using an output signal of a temperature sensor monitoring a temperature of a coolant of the internal combustion engine as the measurement signal.

* * * * *